United States Patent [19]

Walter et al.

[11] 4,434,640

[45] Mar. 6, 1984

[54] PROCESS FOR THE PRODUCTION OF A BEARING BUSHING WITHOUT MACHINING

[75] Inventors: Lothar Walter, Schweinfurt; Manfred Brandenstein, Eussenheim; Armin Olschewski, Schweinfurt, all of Fed. Rep. of Germany

[73] Assignee: SKF Kugellagerfabriken GmbH, Schweinfurt, Fed. Rep. of Germany

[21] Appl. No.: 300,657

[22] Filed: Sep. 9, 1981

[30] Foreign Application Priority Data

Sep. 17, 1980 [DE] Fed. Rep. of Germany ....... 3034951

[51] Int. Cl.³ ............................................. B21D 22/00
[52] U.S. Cl. ...................................... 72/348; 72/354; 72/356; 72/358; 72/379
[58] Field of Search ................. 72/348, 356, 358, 359, 72/379, 354

[56] References Cited

PUBLICATIONS

Gustave F. Bahr, "Drawing Shells with Sharp Corners", Feb. 19, 1920, American Machinist, vol. 52, No. 8.

Primary Examiner—Lowell A. Larson
Assistant Examiner—David B. Jones
Attorney, Agent, or Firm—Eugene E. Renz, Jr.

[57] ABSTRACT

A method for making a bearing bushing for the support of the trunnion in universal joints comprising a cylindrical sleeve section, a bottom section at one axial end of the cylindrical sleeve section, the peripheral edge joining the sleeve section and bottom section being of small cross-sectional radius, consisting of the steps of shaping a blank to form the sleeve section and bottom section which uniformly extends axially inwardly to a central tip and thereafter flattening from the inside at least in the area of the central tip of the bottom section while supporting the bottom section and corresponding forging the outside surfaces of the bottom section in the area of the peripheral edge between the surface of the sleeve section and outside surface of the bottom section.

7 Claims, 3 Drawing Figures

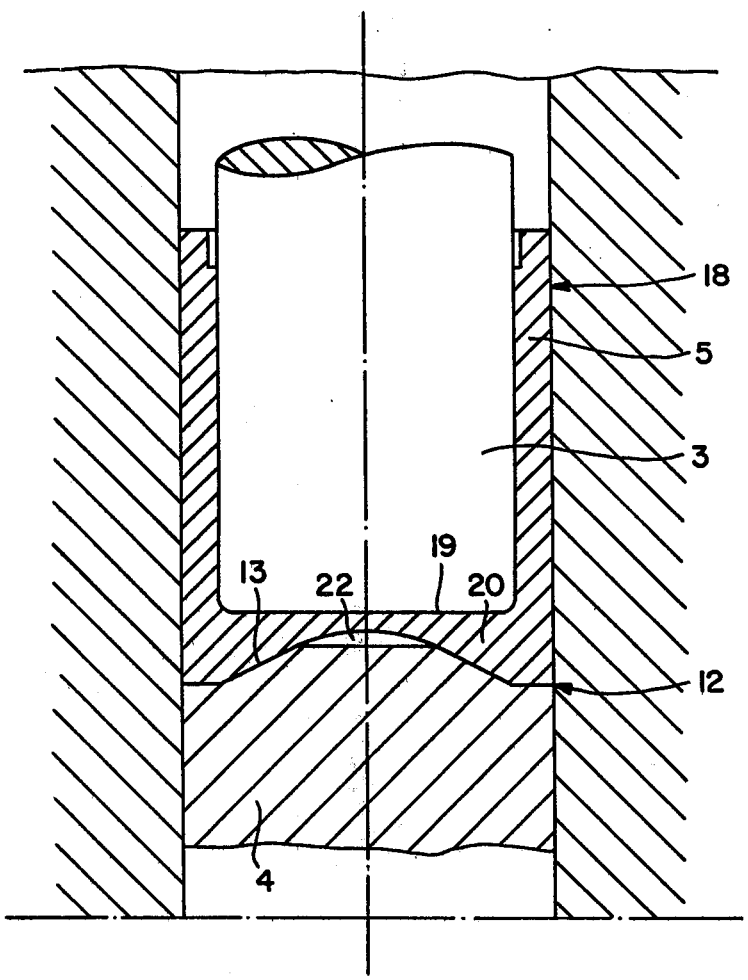

PROCESS FOR THE PRODUCTION OF A BEARING BUSHING WITHOUT MACHINING

BACKGROUND AND SUMMARY OF THE INVENTION

The present invention relates to a method for making a bearing bushing without machining specifically the type used for the support of trunnions in universal joints. These bearing bushings which are shaped in a die typically comprise a cylindrical sleeve section and a bottom section closing the sleeve section off at one axial end thereof and a peripheral edge with a very small cross sectional radius formed between the outer peripheral surface of the sleeve section and the outer axial end face of the bottom section.

The prior art discloses a process for forming bearing bushings in this fashion wherein first a blank with essentially a flat bottom section is produced which is subsequently deformed in the radial direction at its outer rim. This known process which is disclosed in German Preliminary Application 1,575,502 has the disadvantage that the material of the bearing bushing flows irregularly at its rim particularly in the transition zone between the outer peripheral surface of the sleeve section and the outer axial end face of the bottom section since the drawing and supporting rim of the die are disposed in an offset engagement at the periphery because of the inevitably small guiding and shaping defects in the die. This non-uniform flow of material is particularly critical in bearing bushings used as the support of trunnions in universal joints where the edge should be shaped as a sharp edge at the transition zone between the outer surface of the sleeve section and the outer axial end face of the bottom section. In accordance with the known process, harmful internal stresses, cracks and waviness commonly referred to as the "orange peel effect" are created near the peripheral edge which impairs the strength of the bearing bushing. This type of damage and the non-uniformity of the material of the bearing bushing can ultimately lead to fracture of the bearing bushing wall when it is axially stressed, for example, by the front surface of the trunnion of a universal joint, which axially abutts the bottom section of the bearing bushing and transmits bearing pressure and bending stresses to the transition zone between the outer peripheral surface of the sleeve section and the outer axial end face of the bottom section.

The present invention provides a method for making bearing bushings which eliminates some of the disadvantages and drawbacks of the prior methods discussed above. Essentially the present invention is based on the objective of providing a method for producing a bearing bushing without machining. To this end, the method steps include molding a blank with a sleeve section and a bottom section disposed at one axial end of the sleeve section and a bottom section disposed at one axial end of the sleeve section and uniformly running axially inward to a central tip and then flattening from the inside at least the central tip of the bottom section by supporting and a corresponding forging at the outside surface of the bottom section in the area of the peripheral edge between the outer surface of the sleeve section and the outer surface or face of the bottom section. Bearing bushings made by this method exhibit high strength and accuracy and it is possible to manufacture bearing bushings in accordance with the present method in a highly economical manner in spite of shaping a peripheral edge with an extremely small cross sectional radius.

Considering the method of the present invention more specifically, the bottom section is initially provided with a central conical tip which is pressed axially inwardly, thereafter flattening the central tip of the blank while supporting an annular zone of the bottom section in the area of the peripheral edge. In this manner the forging pressure is always applied centrally, that is, at the central tip of the bottom section and as a result the forging and bending forces acting in the bottom section are conducted uniformly outwardly to the peripheral edge of the blank. In this manner a uniform flow of the material takes place in the zone of the peripheral edge between the outer peripheral surface of the sleeve section and the outer face of the bottom section to form a relatively sharp fissure-free peripheral edge. It has been found that this uniform material flow is not disturbed even when inevitably small radial offsets or misalignments are present between the tool elements which press from opposite sides at the tip of the bottom section and in the zone of the peripheral edge, for example, as a result of guidance play for the press and support ram.

During cold forming or molding of the peripheral edge, relatively low internal stresses are induced in the material since only slight relative movements take place during forging between the blank material and the pressure surfaces of the forging or molding tools. The friction forces and the resulting active forces exerted by the tools are therefore small so that an advantageously long useful service life of the tools results.

Even small internal stresses which may occur in the zone of the peripheral edge are distributed in rotational symmetry because of the concentric flow of the material in the zone of the peripheral edge even in large sized bearing bushings. For this reason, the bearing bushing so formed is truly concentric about its central axis and it has been found that oval deformation of the bearing bushing when it is taken from the supporting die does not occur. Thus, the bearing bushing produced in accordance with the method of the present invention has a very accurate shape.

In accordance with other specific features of the method set forth above, the material flowing in the wall of the bottom section during the shaping operation and specifically when the central tip is flattened on an annular zone of a supporting tool and is conducted or moved in rotational symmetry in this zone against the supporting tool and there to the peripheral edge into the annular space between the peripheral edge of the blank and the supporting tool and fills this space completely and uniformly. In one of the forging dies illustrated, a conical depression is provided in the bottom wall of the bearing bushing and this contributes to the economy of the process by utilizing tools having simple geometric shapes.

Additional economies can be effected by rounding the central tip of the bottom section and combining that operation with a final deep drawing of the sleeve section of the blank.

BRIEF DESCRIPTION OF THE DRAWINGS

These and other objects of the present invention and various features and details of a method in accordance with the present invention are hereinafter more fully set forth with reference to the schematic illustrations in the drawings, wherein;

FIG. 3 is a cross sectional view through a modified bearing bushing in the die after flattening the central tip of the bottom section of the blank shown in FIG. 1.

DESCRIPTION OF THE PEFERRED METHOD

Figure 1:
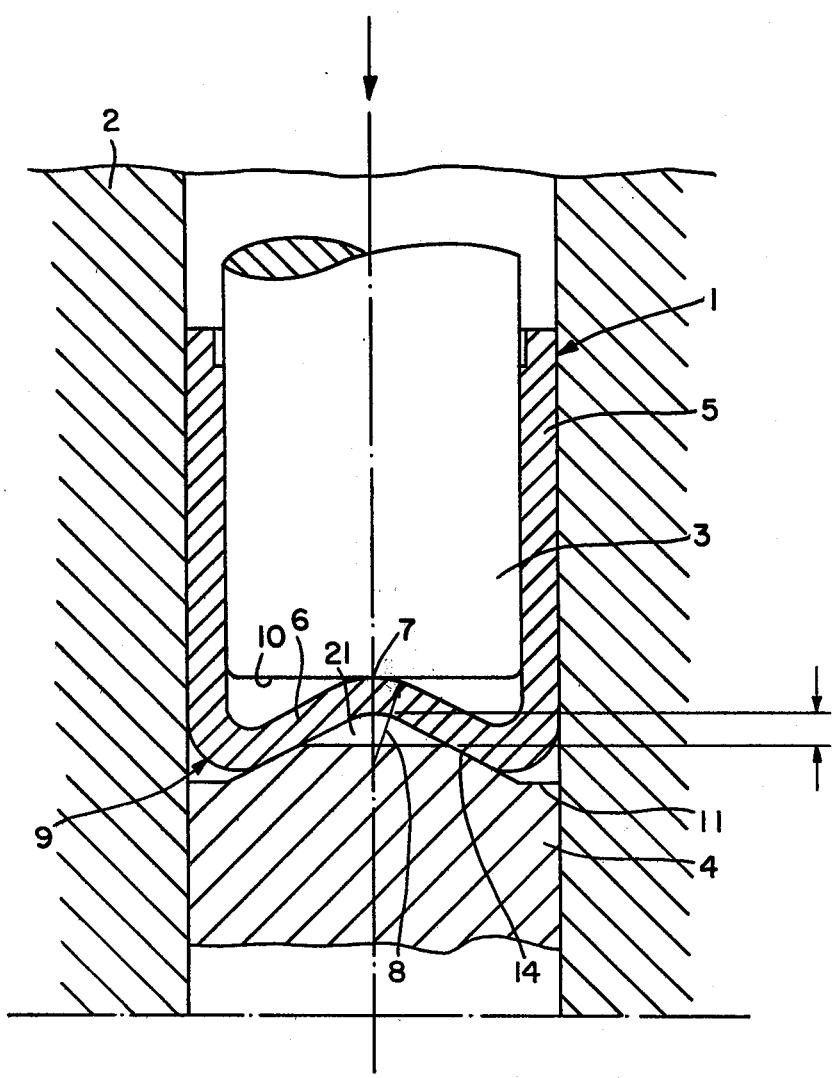
FIG. 1 is a cross sectional view through a molded blank supporting a die before flattening the central tip of the bottom section.

Referring now to the drawings, FIG. 1 shows a blank generally designated by the numeral 1 supported in a die 2 comprising a press ram 3 and a support ram 4. The blank 1 is formed without machining from a strip shaped material, for example, sheet metal, so that it has the shape illustrated and comprises a generally cylindrical sleeve section 5 and a bottom section 6 which closes the sleeve section at one axial end thereof. As illustrated, the bottom section 6 of the blank 1 runs uniformly axially inwardly, that is without bends and steps to a central tip 7 which projects axially into the sleeve section 5 as shown. In the present instance, a conical bottom section which is pressed axially inwardly is formed wherein the central tip 7 has a smoothly rounded arcuate inner face. The peripheral edge 9 between the outer peripheral surface of the sleeve section and the outer wall or surface of the conical bottom section is rounded relatively sharply as illustrated.

Figure 2:
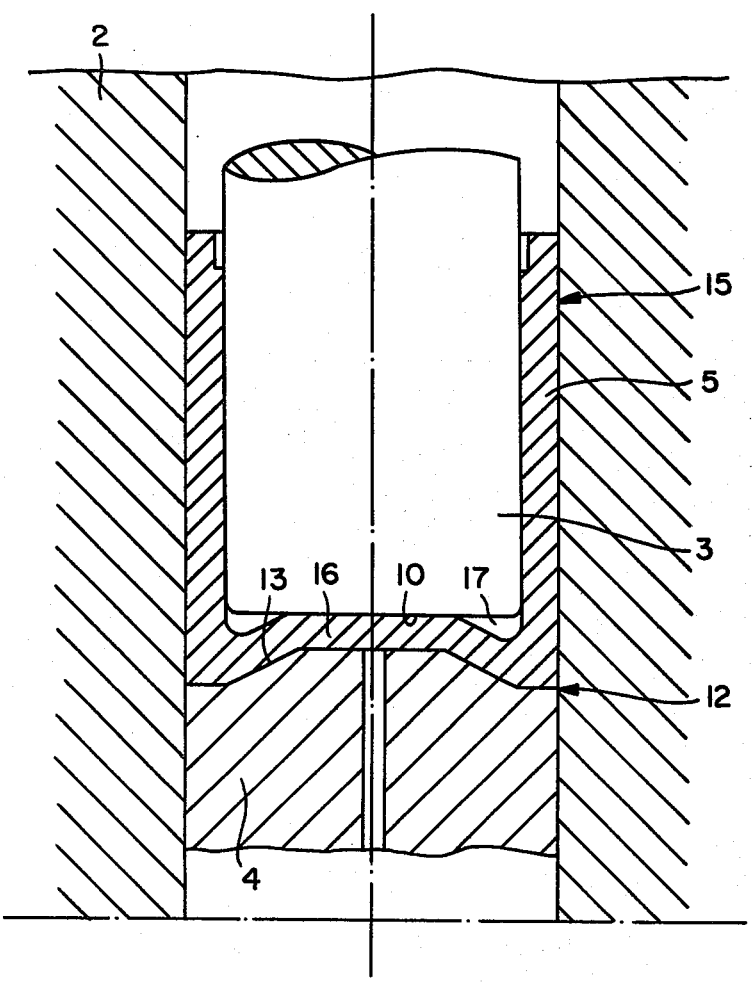
FIG. 2 shows a cross section through a bearing bushing in the die after flattening the central tip of the bottom section of the blank shown in FIG. 1.

In the next method step, the central tip 7 of the bottom section 6 of the blank is flattened in the die 2 by the press ram 3 which has a flat front surface 10 and is movable axially in the sleeve member in the direction indicated to press the conical bottom wall against the forming face of the support ram 4. Note that the front surface of the support ram 4 has an annular flat face or section located in a radial plane at its outer rim for shaping the peripheral edge 12 to a very small cross sectional radius as shown in FIGS. 2 and 3. The front surface of the support ram 4 has a central truncated cone-shaped projection extending radially inwardly from the peripheral edge 12 which supports an annular zone 14 of the bottom section 6 in the zone of the peripheral edge 9 when the central tip 7 of the blank is flattened so that the material is conducted from the inside along the zone 14 into the annular space between the rounded peripheral edge 9 and the flat section 11 to finally fill this space completely. When the central tip 7 of the bottom section is being formed or flattened by the ram 3, the peripheral edge 12 is shaped with an extremely small cross sectional radius by essentially forging the bottom section 6 radially outwardly.

Turning now to FIG. 2, there is shown a bearing bushing 15 made without machining after the central tip 7 of the bottom section of the blank 1 has been flattened. The outer face of the bottom section 16 has completely conformed to the cross sectional shape of the flat section 11 of the support ram 4 and as a result a sharp peripheral edge 12 is formed which has an extremely small cross sectional radius at the juncture of the outer peripheral surface of the sleeve section 5 and the outer face of the bottom section 16. Further as also illustrated in FIG. 2, the flat front surface 10 of the press ram 3 has flattened the central tip 7 of the blank 1 from the inside only in the central portion of the inside surface of the bottom section 16 so that in the zone of the peripheral edge 12, an annular free space 17 remains between this inside surface and the flat front surface 10 of the press ram 3 and into which more or less material can flow corresponding to the press stroke and the varying volume of the flattened bottom section 16.

There is illustrated in FIG. 3 a modified bearing bushing 18 which has a completely flat inside surface 19 after the tip 7 of a blank 1 of the type shown in FIG. 1 has been flattened which is shaped by the press ram 3 and extends up to the sleeve section 5.

When flattening the tip of the bottom section 20, the original centrally located intermediate space 21 between the bottom section 6 of the blank and the support ram 4 (FIG. 1) is reduced so that after flattening the relatively narrow intermediate space 22 shown in FIG. 3 remains. Any excess material of the bottom section 6 is pressed into this intermediate space 22 during flattening.

Even though the particular method for production of a bearing bushing without maching in accordance with the present invention has been illustrated and described herein, it is to be understood that modifications may be made within the scope of te invention. For example flattening of the central tip of the body section is preferably combined with a final deep drawing of the sleeve section of the blank so that the material of the bottom section of the blank which is radially forged outwardly is pressed into the gap between the die and the press ram and deep drawn. Additionally, when molding the blank, it is not necessary that the central tip be of a conical configuration during this molding, the bottom section could rather be pressed axially inwardly so that it runs uniformly arched or curved from its inwardly bent portion of its outer periphery toward the tip. The inside surface of the arched bottom may then be more or less convexly arched at the tip portion of the bottom section depending on the desired degree of forging and the flowing ability of the material of the blank from which the bearing bushing is formed.

What is claimed is:

1. A method for making a bearing bushing for the support of the trunnion in universal joints comprising a cylindrical sleeve section, a bottom section at one axial end of the cylindrical sleeve section, the peripheral edge joining the sleeve section and bottom section being of small cross-sectional radius, consisting of the steps of shaping a blank to form the sleeve section and bottom section which uniformly projects axially from the juncture of the sleeve section and bottom section to a central dome-shaped tip and thereafter flattening from the inside at least in the area of the central dome-shaped tip of the bottom section while supporting the bottom section, said dome-shaped tip being spaced from said bottom support prior to said flattening step and correspondingly forging the outside surfaces of the bottom section in the area of the peripheral edge between the surface of the sleeve section and the outside surface of the bottom section.

2. A method for making a bearing bushing for the support of the trunnion in universal joints comprising a cylindrical sleeve section, a bottom section at one axial end of the cylindrical sleeve section, the peripheral edge joining the sleeve section and bottom section being of small cross-sectional radius, consisting of the steps of shaping a blank to form the sleeve section and bottom section which uniformly projects axially from the juncture of the sleeve section and bottom section to a central dome-shaped tip and thereafter supporting the bottom section on one side and engaging the central dome-shaped tip with the face of a forging ram to flatten the bottom section at least in the area of the central dome-shaped tip and correspondingly forging the outside surfaces of the bottom section in the area of the peripheral edge between the surface of the sleeve section and the outside surface of the bottom section.

3. A method as claimed in claim 1 wherein the central tip is conically pressed axially inwardly during the initial shaping of the blank.

4. A method as claimed in claim 1 wherein the central tip of the bottom section is rounded during initial shaping of the blank.

5. A method as claimed in claim 1 including a final deep drawing of the sleeve section of the blank during the step flattening the central tip of the bottom section.

6. A method as claimed in claim 1 wherein the bottom support comprises a support ram having a central truncated cone-shaped projection extending radially inwardly from the peripheral edge which supports an annular zone of the bottom section when the central dome-shaped tip is flattened whereby material is conducted from the inside along said zone into the annular space between the peripheral edge and the flat annular section of the support to fill this space completely, the said flattening resulting in complete conformity of the bottom section to the cross-sectional shape of the annular flat section of the support ram.

7. A method as claimed in claim 1 wherein said flattening of the inside of the blank produces a completely flat inside surface after the dome-shaped tip has been flattened.

* * * * *